(12) United States Patent
Cohen et al.

(10) Patent No.: US 6,820,042 B1
(45) Date of Patent: Nov. 16, 2004

(54) MIXED MODE NETWORK SIMULATOR

(75) Inventors: Alain Cohen, Washington, DC (US); George Cathey, Washington, DC (US); Patrick J. Malloy, Washington, DC (US)

(73) Assignee: Opnet Technologies, Bethesda, MD (US)

( * ) Notice: Subject to any disclaimer, the term of this patent is extended or adjusted under 35 U.S.C. 154(b) by 913 days.

(21) Appl. No.: 09/624,092

(22) Filed: Jul. 24, 2000

Related U.S. Application Data (60) Provisional application No. 60/145,794, filed on Jul. 27, 1999, and provisional application No. 60/145,303, filed on Jul. 23, 1999.

(51) Int. Cl.[7] .................. G06F 17/10; G06F 17/50; G06F 7/60
(52) U.S. Cl. .............. 703/2; 703/13; 703/17; 703/21; 703/22; 702/182; 702/186; 702/179; 702/181
(58) Field of Search .............. 703/2, 17, 13, 703/21, 22, 20; 702/182, 186, 179, 181; 709/223, 220, 224, 221, 222

(56) References Cited

U.S. PATENT DOCUMENTS

| | | | | |
|---|---|---|---|---|
| 4,669,113 A | * | 5/1987 | Ash et al. | 379/221.01 |
| 4,792,913 A | * | 12/1988 | Buckland et al. | 708/3 |
| 4,979,118 A | * | 12/1990 | Kheradpir | 701/117 |
| 5,197,127 A | * | 3/1993 | Waclawsky et al. | 709/224 |
| 5,317,525 A | * | 5/1994 | Taoka et al. | 703/18 |
| 5,440,719 A | * | 8/1995 | Hanes et al. | 703/21 |
| 5,481,484 A | * | 1/1996 | Ogawa et al. | 703/14 |
| 5,537,468 A | * | 7/1996 | Hartmann | 379/221.01 |
| 5,561,841 A | * | 10/1996 | Markus | 455/446 |
| 5,583,792 A | * | 12/1996 | Li et al. | 709/224 |
| 5,701,439 A | * | 12/1997 | James et al. | 703/17 |
| 5,794,005 A | * | 8/1998 | Steinman | 703/17 |
| 5,809,282 A | * | 9/1998 | Cooper et al. | 709/226 |
| 5,828,867 A | * | 10/1998 | Pennell | 703/6 |
| 5,881,237 A | * | 3/1999 | Schwaller et al. | 709/224 |
| 6,081,843 A | * | 6/2000 | Kilkki et al. | 709/232 |
| 6,134,514 A | * | 10/2000 | Liu et al. | 703/17 |
| 6,393,386 B1 | * | 5/2002 | Zager et al. | 703/25 |
| 6,442,141 B1 | * | 8/2002 | Borella et al. | 370/248 |
| 6,466,925 B1 | * | 10/2002 | Harald et al. | 706/16 |

* cited by examiner

Primary Examiner—William Thomson
(74) Attorney, Agent, or Firm—Robert M. McDermott (57) ABSTRACT

A simulation system and method that combines the advantages of both analytical modeling and discrete-event simulation is disclosed. In a preferred embodiment of this invention, traffic on the network is modeled as a combination of background-traffic and explicit-traffic. The background-traffic is primarily processed in an analytical form, except in the "time-vicinity" of an explicit-event. Explicit-events are processed using discrete-event simulation, and the modeled effects are dependent upon the background-traffic. At each occasion that the background-traffic may affect the explicit-traffic, the background-traffic is particularized into events that are modeled at the lower detail level of the explicit-traffic. In this manner, the portions of the network that are unaffected by the explicit-traffic and that have no effect on the explicit-traffic are modeled and processed at an analytical level, consuming minimal processing time and memory resources, while the portion of the network affected by the explicit-traffic and the background-traffic that affects the explicit-traffic are processed at the lower level of detail.

20 Claims, 5 Drawing Sheets

MIXED MODE NETWORK SIMULATOR

This application claims the benefit of U.S. Provisional Application No. 60/145,303, filed Jul. 23, 1999, and U.S. Provisional Application No. 60/145,794, filed Jul. 27, 1999.

BACKGROUND OF THE INVENTION

1. Field of the Invention

This invention relates to the field of network systems, and in particular to the simulation of network architectures and configurations to evaluate performance.

2. Description of Related Art

Modeling is a proven technique for estimating the performance of systems. Such modeling is typically based on models of the components of the system and the interactions among components. In a typical performance model, the architecture of the system is encoded as a network of interconnected elements. Each element includes input and output nodes, and a corresponding functional model that describes the production of output node values, based on the input node values, and the state of the element. The network description specifies the interconnections among the input and output nodes of the elements comprising the system. The specification of the interconnections, or links, determines the correspondence between the output node values of each element to the input nodes of other elements.

An analytical evaluation of the performance of the modeled system is effected by specifying a set of initial conditions, if any, to each element, and a set of input values or parameters to the input nodes of the system. Various modeling techniques may be employed, depending upon the function of the system being modeled and the performance factors of interest. Information processing and communications systems are often modeled using stochastic models that describe the information transfer via a statistical generalization of the information being transferred and the performance and limitations of each element and link of the system. For example, an input to a processing element is described using statistics that describe an expected pattern of inputs, such as, for example, an average arrival rate of new messages, an average size of each message, and so on. Similarly, the capability of the processing element is described in terms of the average throughput rate, maximum queue length, and so on. The determination of the output characteristics of each processing element is typically based on classical "Queuing Theory" models that can provide estimates of delay time, queue size, and other parameters associated with a sequential process. As is known in the art, queuing theory models provide a "steady-state" estimate of these output parameters. That is, statistically, if an average number of items having an average number of units arrives at a element that can process an average number of units per unit time, the output of the element will be an average number of items having an average processing delay relative to the input, the element itself will have an average queue length, and so on. Of particular significance, because the analytical model provides a "steady-state" estimate, the initial conditions of the system are not significant, because any out-of-the ordinary effects of initial conditions can be expected to diminish in time, as the system approaches the steady-state condition.

The analytical model processing system computes the results associated with each element, based on the element model, or transfer equation. Because one element's computed output may affect another elements input, as determined by the interconnections within the modeled system, this computation is repeated until each of the elements provides a stable output. This process is similar to a conventional "spread sheet" program that computes the overall effect of a change to a value of a cell in the spread sheet by repeatedly processing the equations associated with the spread sheet until the effect of the changed value, if any, is reflected in every cell.

In the field of network simulations, analytical modeling techniques are particularly well suited for estimating such parameters as: a link utilization factor that identifies the volume of traffic flowing in each link, relative to the size, or bandwidth, of each link; a network latency factor associated with each pair of nodes in the network that identifies a composite of queuing delays, processing delays, and path delays between any two nodes in the network; and so on.

Analytical models, however, are not well suited for assessing the effects of protocol handling, including, for example, the effects of the segmentation of information items into packets, congestion control and packet discarding, retransmissions, weighted fairness algorithms, and so on. In like manner, the steady-state analytical models do not address the dynamics of traffic patterns nor, as mentioned above, the effects of initial or abnormal conditions. The steady-state analytical models primarily rely on traffic volume to determine the aforementioned link utilization and network latency performance measures. Also, the analytical modeling of the extremes of behavior is substantially more complex than merely modeling the average behavior, and the determination of such parameters as the peak delay time, or a profile of response times, in general, is rarely available using analytical models.

An alternative to analytical modeling is discrete-event simulation. In a discrete-event simulation, the network is also modeled using elements and links that interconnect elements, but the models utilized for each element are designed to provide a specific output response to a specific input event, rather than a statistical model. That is, for example, a model of a transmitter includes a model of a queue to receive a group of packets corresponding to an information item, and an output generator that removes each packet from the queue and places it at its output after a specified processing time, at the transmitter's transmission rate. If additional packets arrive at the transmitter's input, they are placed in the modeled queue, and wait their turn to be transmitted. Statistical parameters, such as the average number of packets in the transmitter's queue, are determined by periodically monitoring the modeled queue to determine the actual number of packets that are in the queue at each monitored time. The packets that are placed at the output node of an element are propagated via the interconnection links, and arrive at the node at the other end of the link after a propagation delay associated with the link. Upon arrival, the packets are each similarly processed by the model associated with the receiving element.

Because discrete events are modeled, the models associated with each element or link can be explicit, and need not contain a closed-form analytical model. For example, the aforementioned transmitter may have alternative transmission paths for communicating each packet, based on a destination address contained within the packet. The transmitter model need merely contain a conditional statement that places each packet in the queue onto the appropriate output, based on the destination address of each packet. In like manner, the effects of transmission errors can be modeled by randomly introducing errors into each packet, depending upon parameters associated with the elements or links. A receiving device can be modeled to reject a packet if the number of randomly introduced errors exceed a given threshold, and the transmitter can be modeled to effect a retransmission of the packet upon notification of the rejection. In this manner, the actual packet throughput in the presence of random noise can be determined based on simulated packet transmissions in the presence of simulated noise. Depending upon the level of detail of the model, packet transformations can also be modeled, for example, by modeling a packet as it is processed by its associated protocol. For example, using the ISO-OSI protocol reference model, packets may be generated at an application layer and transformed through the various layers until the simulation models the transfer of bits at the physical layer. At each stage of the transformation, processing and queue delays may be introduced, error detection and processing may be modeled, and so on. Attempting to model such explicit behavior in a closed form analytical model is virtually impossible.

A discrete-event simulation of a network of reasonable size often involves the generation of hundreds of thousands of input events, and the subsequent processing and propagating of these events through the network until each modeled event arrives at its intended destination. Often, a realistic discrete-event simulation can run for hours or days on fairly powerful computers, and consume large amounts of memory resources as each generated and propagated event is tracked through the network. An analytical model of a similarly sized system, on the other hand, is typically run in a matter of seconds or minutes, and consumes a relatively small amount of data. That is, conventionally, the determination of detailed information regarding the performance of a network requires a substantial amount of time and resources, whereas the determination of overall performance measures can be determined quickly, provided that the appropriate theoretical models are available.

BRIEF SUMMARY OF THE INVENTION

It is an object of this invention to provide a method of simulation that provides the ability to obtain detailed performance information at a substantially higher speed than conventional discrete-event simulation. It is a further object of this invention to provide a method of analytical modeling that provides more detailed performance measures than a conventional analytical model. It is a further object of this invention to provide a system that allows for the simulation of a network using the above methods.

These objects, and others, are achieved by providing a method of simulation that combines the advantages of both analytical modeling and discrete-event simulation. In a preferred embodiment of this invention, traffic on the network is modeled as a combination of "background-traffic" and "explicit-traffic". The background-traffic is primarily processed in an analytical form, except in the "time-vicinity" of an explicit-traffic event. Explicit-traffic events are processed using discrete-event simulation, but the modeled effects are dependent upon the background-traffic and corresponding particularized background-traffic events.

Immediately before and during each discrete-event time, the background-traffic is processed to produce discrete background-traffic events. These background-traffic events are processed by each element and link model as discrete events that are simulated along with the actual explicit-events. At all other times, the background-traffic is processed using conventional analytical modeling techniques. In a preferred embodiment of this invention, the background-traffic model includes timing parameters, and the simulation method also provides for a time-varying analytical modeling technique.

BRIEF DESCRIPTION OF THE DRAWINGS

The invention is explained in further detail, and by way of example, with reference to the accompanying drawings wherein.

Throughout the drawings, the same reference numeral indicates similar or corresponding features or functions.

DETAILED DESCRIPTION OF THE INVENTION

This invention is premised on the observation that a network simulation is often performed in order to determine the effects of a particular proposed change, to determine the performance for a particular user or group of users, and so on. In these applications, the particular item, or items, of interest only affects a portion of the network, and a detailed analysis is only required for this affected portion of the network. However, the simulation of the network cannot be limited to only the portion of the network that is affected by the item of interest, because the other portions of the network may have an effect on this affected portion. Therefore, a conventional discrete-event simulator processes the entire network, at a common level of detail, independent of the item(s) of interest or the portions of the network affected by the item of interest. A preferred embodiment of this invention, on the other hand, allows the user to classify network activity as either explicit-traffic or background-traffic. Explicit-traffic is modeled at a detailed level, while the background-traffic is modeled primarily at a higher, analytical, level, the explicit-traffic corresponding to the items of interest in the performance evaluation. At each occasion that the background-traffic may affect the explicit-traffic, the background-traffic is modeled at the lower detail level of the explicit-traffic. In this manner, the portions of the network that are unaffected by the explicit-traffic and that have no effect on the explicit-traffic are modeled and processed at an analytical level, consuming minimal processing time and memory resources, while the portion of the network affected by the explicit-traffic and the background-traffic that affects the explicit-traffic are processed at the lower level of detail.

Figure 1:
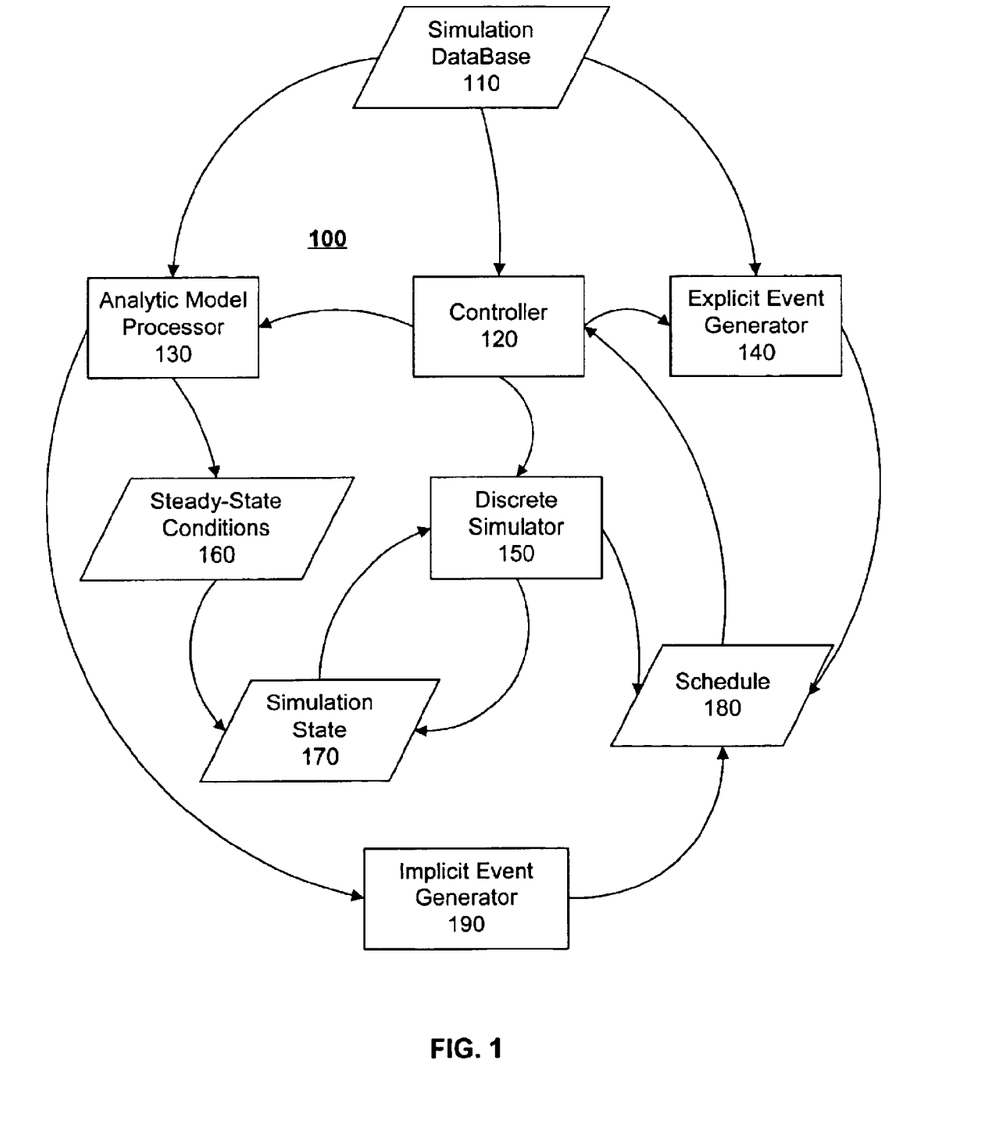
FIG. 1 illustrates an example block diagram of a mixed-mode simulator in accordance with this invention.

FIG. 1 illustrates an example block diagram of a mixed-mode simulator 100 in accordance with this invention. The simulator 100 includes a controller 120 that coordinates the actions of an analytic model processor 130, an explicit-event generator 140, and a discrete simulator 150 to effect a simulation of a system that is suitably encoded in a simulation database 110. For ease of reference, the system being simulated is hereinafter referred to as the network being simulated, because network simulations are particularly well suited to the principles presented in this disclosure. It will be recognized by one of ordinary skill in the art that other systems may also be simulated using the principles presented herein.

As discussed above, the network is encoded, in the simulation database 110, as a combination of elements and their interconnection. Some of the elements represent devices that generate messages that are communicated to other elements via the element interconnections. For ease of reference, the term packet is used herein as a paradigm for a unit message, and may contain one or more items, or bits, of information. The term traffic is used herein to represent the occurrence of transmitted packets via the interconnections. Using this terminology, some of the elements generate traffic, some of the elements absorb traffic, some of the elements route traffic, some of the elements switch traffic, and so on. The term absorb is used herein to represent the receipt of packets without a subsequent corresponding retransmission of the packets. Generally, elements have zero or more inputs and zero or more outputs; generators produce more output traffic than input traffic, absorbers produce less output traffic than input traffic, and most other devices produce output traffic that substantially corresponds to the input traffic. The simulator simulates the propagation of traffic throughout the network, and determines corresponding properties associated with this traffic propagation. The properties typically relate to performance measures, such as delay times, queue lengths, path utilization, and so on.

In accordance with this invention, the traffic that is simulated is characterized as either background-traffic or explicit-traffic. The explicit-traffic is simulated as a series of discrete events, whereas the background-traffic is not necessarily "simulated" at all. The background-traffic provides a description of the environment within which the explicit-traffic is propagated. For example, the background-traffic may be encoded as a utilization factor for a particular interconnection, or link. If an element processes packets from that link at a particular rate, that element's ability to process an explicit packet will be dependent upon the link utilization factor. That is, for example, if the background-traffic utilization factor is 50%, the processing of an explicit packet can be expected to require twice as much time as compared to a background-traffic utilization factor of 0%, because half the time, the element will be processing the background-traffic. In like manner, a background utilization factor of 90% can be expected to increase the processing of each explicit packet by a factor of 10, because, by definition, nine out of ten of the processed packets will be the packets associated with the background-traffic.

The analytic model processor 130 processes the background-traffic, while the discrete simulator 140 processes the explicit-traffic. Generally, the operation of the analytic model processor 130 and the discrete simulator 140 is similar to the operation of a conventional analytic model processor and a conventional discrete simulator, respectively, the principles of which are common to one of ordinary skill in the art. As contrast to the prior art, the controller 120 coordinates the operation of the analytic model processor 130 and the discrete simulator 140 so as to effect a high-speed, minimal detail, analytic modeling, concurrent with a highly-detailed, slower-speed, discrete model simulation.

As in the conventional analytical modeling process, the analytic model processor 130 processes the parameters that characterize the background-traffic to determine the steady-state condition 160 of the network while this background-traffic is present. These parameters, for example, may include an average packet size, a variance associated with the packet size, an average packet arrival rate, and a variance associated with the packet arrival rate. In accordance with the principles of this invention, these steady-state conditions 160 are used to initialize the simulation state 170. For example, if a number of links are characterized by background-traffic parameters, the analytic model processor determines, for example, the average queue length (number of packets waiting to be processed) at each element, and the simulation state 170 is configured to model each element's queue as containing this determined number of packets.

As in the conventional discrete event simulator, the explicit-event generator 140 generates a sequence of events based on the explicit-traffic parameters. For example, an element may be encoded as a traffic generator having a particular packet rate and a particular packet size. The explicit-event generator 140 produces appropriately sized packets that are transmitted at the specified rate. As is common in the art, the traffic generation may be specified as a stochastic process, with parameters that specify the probability distribution associated with the generated traffic, and the explicit event generator 140 stochastically generates the packets in accordance with the specified parameters. The generator 140 places each explicitly generated packet onto a schedule 180 for processing by the discrete simulator 150. The discrete simulator 150 processes each item in the schedule 180, in a time-sequential order. For example, an attribute of a link between two elements may be a propagation delay, d0, across the link. If a packet is scheduled to be transmitted across that link at time t0, the discrete simulator 150 will simulate this transmission by scheduling the packet to be received at the other end of the link at time t0+d0. This receiving event is placed in the schedule 180, at the scheduled t0+d0 time. At the simulated time of t0+d0, the discrete simulator 150 effects whatever action is appropriate at the receiving element at the other end of the link. For example, a receiving element typically includes a queue for receiving each packet. The discrete simulator 150 updates the queue model of the receiving element to indicate that the received packet is placed into the queue at the next available location. In like manner, the discrete simulator 150 simulates the receiving element by periodically removing the next packet from the queue, advancing the queue, and scheduling, via the schedule 180, the removed packet to be transmitted from its output after some specified processing time, p0, associated with the receiving element. Eventually, the aforementioned transmitted packet progresses through the queue, and is scheduled to be transmitted from the output of the receiving element at time t0+d0+q0+p0, where q0 is the duration that the packet remained in the queue. Using this same event-processing technique at each stage of the packet's propagation, this transmitted packet reaches its destination at some later time t1. As in the conventional discrete event simulator, the details related to the propagation of each packet are collected, and statistics are formed that characterize the propagation, such as an average queue time at each element, an average processing time, an average propagation delay (t1–t0), minimum and maximum propagation delays, and so on.

Note that, as presented above, in accordance with one aspect of this invention, the analytical modeling of the background-traffic provides a steady-state condition 160 that is used to affect the simulation state 170 that is used by the discrete simulator 150. For example, the queue time duration q0 will be dependent upon the number of packets that are in the queue (the queue length) of the receiving element when the transmitted packet arrives. The analytic model processor 130 determines an average queue length at each element associated with the presence of background-traffic, and the queue length that the discrete simulator 150 uses during the simulation of the explicit transmitted packet is dependent upon this determined average queue length. It is significant to note that, in accordance with this aspect of the invention, the simulated number of packets in the queue caused by the background-traffic is determined without actually simulating each of the packets associated with the background-traffic, thereby saving considerable processing and memory resources. In addition to queue lengths, other background-traffic effects can be analytically determined, using conventional analytic techniques such as queuing theory models, and will be evident to one of ordinary skill in the art in view of the principles presented above.

In accordance with another aspect of this invention, a preferred embodiment of this invention also includes an implicit-event generator 190 that can be used to provide an additional level of detailed analysis. As presented above, the use of an analytic model processor 130 provides an estimate of the steady-state conditions 160 that an explicitly simulated packet will encounter, without requiring an explicit simulation to produce a simulation state 170 corresponding to these steady-state conditions 160. In addition to these steady-state effects upon queue length and the like, individual packets associated with background-traffic may have an impact on the processing or routing of an explicit-traffic packet, particularly during the simulation of a particular communications protocol or traffic control techniques. For example, if a particular communications path is characterized as using a collision dependent protocol, the propagation of a packet across this path is dependent upon whether a collision occurs while that packet is being transmitted. As is common in the art of discrete simulation, the determination of whether a collision occurs is effected by simulating the collision avoidance techniques that are associated with the particular protocol for each of the packets being transmitted over the path. If, despite the collision avoidance technique, two packets are transmitted over the bus concurrently, a collision has occurred. The subsequent actions related to these packets, such as a subsequent retransmission of each packet or other recovery technique, are simulated based upon the particular protocol. In this manner, the propagation of each packet is simulated subject to the same conditions and actions as an actual transmitted packet. Based on the attributes of each packet's propagation, including the effects introduced by particular communication protocols, statistics related to the system performance can be determined. The use of a steady-state condition 160 corresponding to the presence of background-traffic is generally insufficient to determine these protocol-dependent interactions and effects.

The implicit-event generator 190 provides individual events, such as an occurrence of a stream of packets, corresponding to the parameters of the background-traffic. For ease of reference, these events are termed implicit-events, or implicit-packets, to distinguish these events from the explicit-events, or explicit-packets, associated with the explicit-traffic. In a preferred embodiment, these implicit-events corresponding to the background-traffic are modeled at substantially the same level of detail as the explicit-events, so that the discrete simulator 150 can provide the same level of analysis as would be provided by a conventional discrete simulation that requires a totality of explicit-events. As compared to a conventional discrete simulation, however, the implicit-event generator 190 generates implicit-events only when the occurrence of these implicit-events has a potential of affecting the propagation or processing of an explicit-event. That is, for example, these implicit-events are not generated at elements that are unaffected by the explicitly modeled traffic, nor are they generated at elements that process each packet substantially independent of each other packet. In this manner, the processing and memory resources required for a discrete simulation of individual packets is minimized. Only background-traffic related events that may impact the explicitly modeled events of interest are simulated at a time and resource consuming level of detail; the other background-traffic related events are neither generated nor simulated, thereby saving a considerable amount of time and memory compared to a conventional discrete simulation system.

Figure 2:
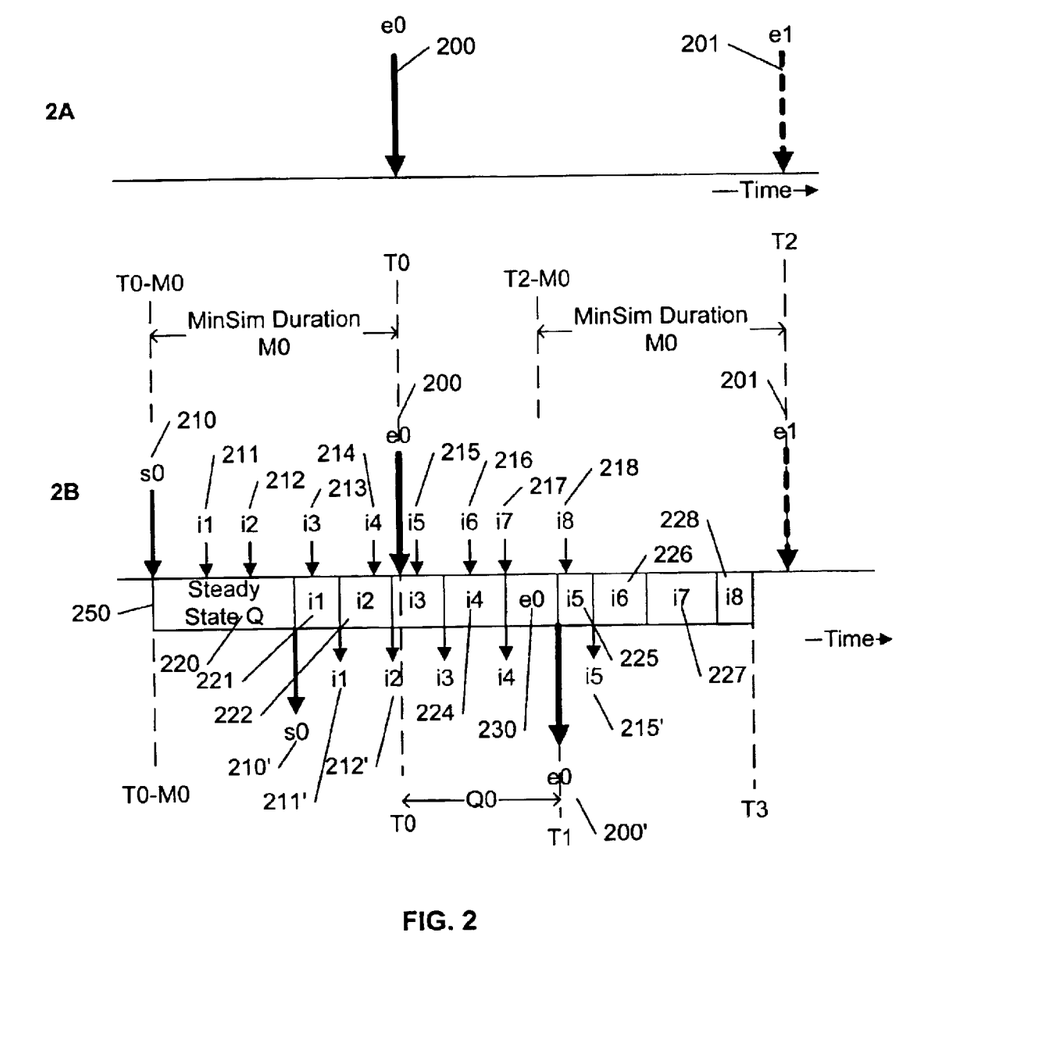
FIG. 2 illustrates an example timing diagram of the processing of explicit-traffic and background-traffic in accordance with this invention.

FIG. 2 illustrates an example timing diagram of the processing of explicit-traffic and background-traffic in accordance with this invention. Line 2A of FIG. 2 illustrates an explicit-event 200 that is scheduled to occur at time T0. Line 2B of FIG. 2 illustrates the generation and processing of implicit-events 211–218 in response to the anticipated occurrence of the explicit-event 200. For ease of understanding, the events of FIG. 2 are presented as the arrivals of packets 230, 220, 221, 222, etc. that are stored in a queue 250 and subsequently removed from the queue 250, as events 200', 210', 211', 212', etc.

When an explicit-event 200 is scheduled to occur at an element at time T0, the state of the element at some time duration M0 before T0 is determined. Conceptually, the occurrence of an explicit-event causes the discrete simulator 150 of FIG. 1 to perform a "mini-simulation" of a combination of the explicit-event and implicit-events corresponding to the background-traffic. Correspondingly, the duration M0 is herein referred to as a "mini-simulation duration", and the time T0-M0 before the scheduled explicit-event is termed the "anticipation time". In effect, the mini-simulation is structured to "anticipate" the arrival of the explicit event, create a composite effect corresponding to the state of the system at this anticipation time, based on the background-traffic, and then simulate the background-traffic as discrete, or particularized, events.

At the anticipation time T0-M0, the state of the element is either active or quiescent. An element is active if there are events pending to be simulated at that element. An element is quiescent if there are no currently pending events to be simulated at that element, and any prior events at the element occurred sufficiently prior to time T0-M0 that the system can be considered to be in a steady-state condition, as discussed above, and as discussed further below.

If the element is quiescent at the anticipation time T0-M0, the analytic model processor 130 of FIG. 1 determines the steady-state conditions 160 corresponding to this element at time T0-M0, and loads the simulation state 170 with a queue length that is dependent upon these steady-state conditions 160. This initial condition of the simulated element is represented on line 2B of FIG. 2 as a steady-state event s0 210 that pre-loads the element queue 250 with a "Steady-state Q" 220. The removal of this initial steady-state load 220 from the queue 250 is illustrated on line 2B as event s0 210' at the end of the steady-state load 220.

After the analytic model processor 130 pre-loads the queue 250 with the initial steady-state load 220, the implicit-event generator 190 generates implicit-events i1–i8 211–218 corresponding to the parameters associated with the background-traffic at this element. That is, the parameters associated with the background-traffic are used to particularize the traffic into a series of specific events. As illustrated on line 2B of FIG. 2, in a preferred embodiment of this invention, these implicit-events i1–i8 211–218 are not necessarily uniform; preferably, the background-traffic is characterized by parameters associated with a stochastic process, and the implicit-event generator 190 generates these implicit-events stochastically, in conformance with these parameters.

As each implicit-event i1 211, i2 212, i3 213, etc. occurs at the input of the element, the element model is applied to each implicit-event to produce a corresponding implicit-event output; in this example, the corresponding event output is the placement of the implicit-packet 221, 222, 223, etc. into the queue 250. As illustrated, each implicit-packet 221, 222, 223, etc. in a preferred embodiment may also be sized in accordance with the parameters associated with background-traffic. That is, i1 221 is illustrated as being smaller in size than i2 222, which is smaller than i4 224, and so on. Subsequent simulation of the element as the simulation time advances results in the implicit-packets 221, 222, etc. being removed from the queue 250 as events i1 211', i2 212', etc.

Based on the simulation of the implicit-events 211, 212, etc., the explicit-event e0 200 is illustrated as occurring after implicit-events i1–i4 211–214 have arrived at the element, and after packets i1 221 and i2 222 have been removed from the queue 250. Explicit-packet e0 230 is placed in the queue 250, after packet i4 224. The explicit-packet e0 230 is removed from the queue 250, after implicit-packets i3 223 and i4 224, at time T1.

As can be seen, the time duration Q0 that the explicit-packet e0 230 remains in the queue 250 is dependent upon the properties of the steady-state condition s0 210, as well as the simulated effects of the implicit-events i1–i4 211–214 that occur before the arrival of the explicit packet e0 230. As noted above, more complex interactions between each explicit-event and the implicitly generated events, such as protocol behavior, may also be modeled using conventional discrete simulation techniques using the techniques presented above.

After the explicit-event e0 200 is processed by the element, at T0, additional implicit-events i5, i6, etc. generally need not be processed, assuming that an event cannot be affected by subsequent events. Illustrated on line 2B of FIG. 2, however, subsequent implicit-events i5–i8 215–218 are generated in a preferred embodiment, and the implicit-packets i5–i7 225–227 that arrive before the explicit-packet e0 230 is removed from the queue 250 are placed in the queue 250. The reason for this continued processing is to properly maintain the state of the element being simulated during this period, in case another explicit-event e1 201 arrives soon after e0 200, at time T2. As discussed above, when an explicit-event is scheduled to occur at an element, the state of the element at an anticipation time before the scheduled explicit-event is determined. As indicated on line 2B, at the anticipation time T2-M0, the element is still active, because the prior explicit-packet e0 230 has not yet been removed 200' from the queue 250. In this case, the implicit-event generator 190 will continue to generate implicit-events (not shown) until this new explicit-event e1 201 is completely processed by the element.

The process of generating and simulating implicit events continues until there are no explicit-events remaining at the element or scheduled within an M0 duration of the generated implicit-events, at which time the implicit-event generator 190 ceases the generation of implicit-events, and the state of the element is cleared, awaiting the next scheduled explicit-event. That is, if explicit event e1 201 does not occur, the implicit-event generator 190 in a preferred embodiment ceases the generation of implicit-events beyond implicit-event i8 218, and the queue 250 is cleared.

To further clarify the process of a preferred embodiment, consider the process upon receipt of the event e1 201. At time T2, e1 occurs, and the state of the system is examined at time T2-M0 (the start of the MiniSim Duration) to determine whether the state of the element is active or quiescent. At time T2-M0, there are several packets waiting for processing by the element: the remaining portion of e0 230, and the entirety of packets i5 225 through i8 228. Collectively, these packets will finish processing at time T3. At time T2-M0, therefore, the element will be "active" for a further duration of T3-(T2-M0). The quantity T3-(T2-M0) has units of time, and is referred to as the preexisting work in the element at time T2-M0. "Work" in this context has units of (simulated) time, and signifies how long the element will take to process the current packets in the system. In the example illustrated with the arrival of e1 201, it is not appropriate to use the "steady state" estimate of the element at time T2-M0, because this "initial condition" (the existence of explicit and implicit events) is available and potentially relevant, and would be ignored if a steady-state estimate is used, as noted above. Therefore, in a preferred embodiment, the "steady state" estimate is not used, and the system continues to generate implicit-events after i8 218 (not illustrated), using the same technique as discussed above regarding events i1–i8 211–218.

Note that the decision whether to use the steady state estimate or to continue with the generation and simulation of implicit events may introduce anomalies when the steady state estimate at a time just beyond the completion of work at an element is substantially different from the work at the element at the last simulated explicit event. A straightforward approach is to assume that the load on the element approaches the steady state condition upon completion of the processing of the explicit event at the element. This load between the completion of the processing of the explicit event and the commencement of a mini-simulation for the next explicit event at the element can be estimated as a linear increase or decrease, but preferably a function that asymptotically approaches the steady-state load from the last simulated load is preferred. Other options for accommodating the transition from mini-simulation to steady-state simulation are discussed further below.

Figure 3:
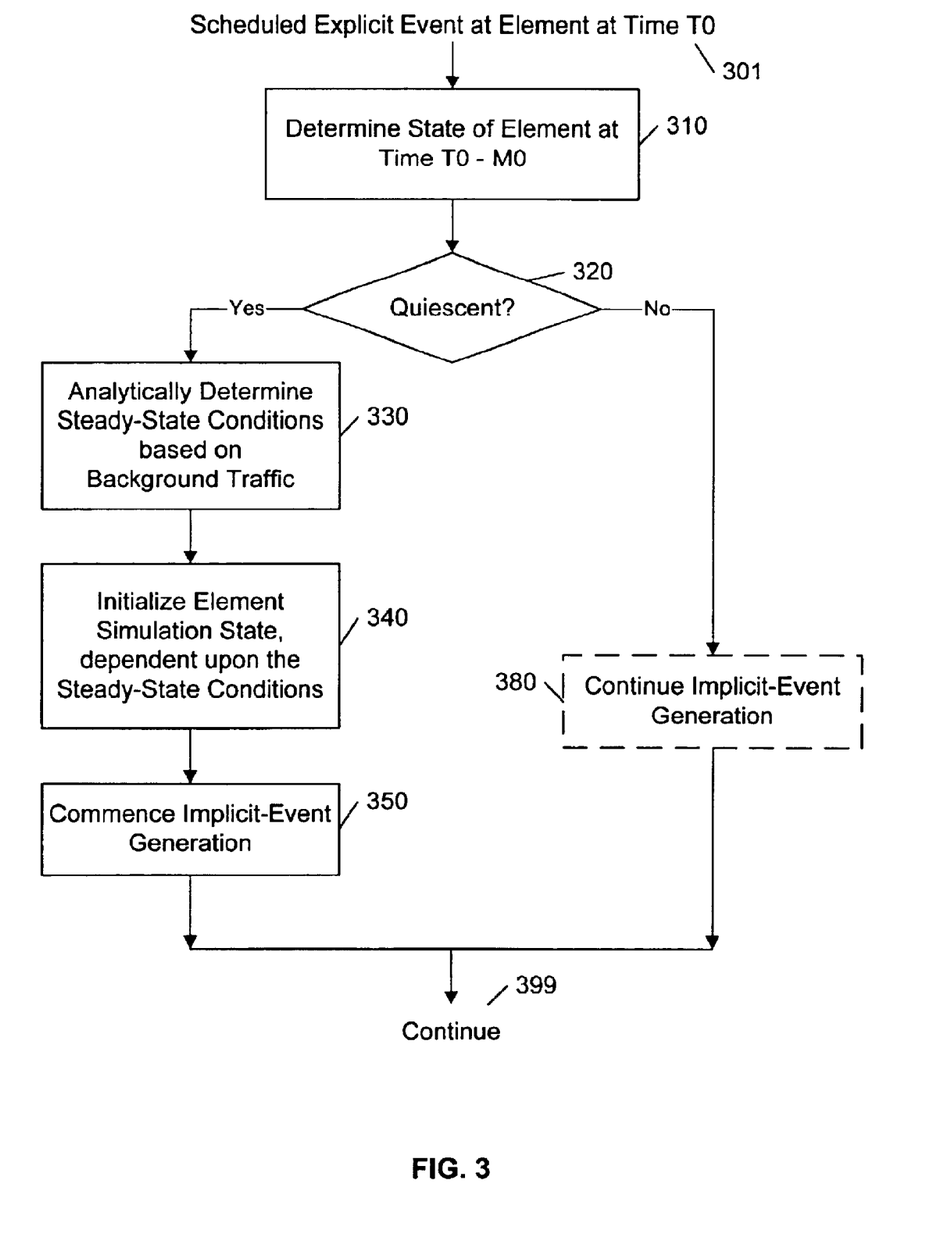
FIG. 3 illustrates an example flow diagram of a mixed-mode simulator in accordance with this invention.

FIG. 3 illustrates an example flow diagram of a mixed-mode simulator in accordance with this invention, corresponding to the principles discussed with regard to FIGS. 1 and 2. When an explicit-event 301 is scheduled to occur at an element at time T0, the state of the element at time T0-M0 is determined, at 310. M0 is a parameter that is predefined for each element type, and is typically a function of the volume of background-traffic. It is preferably long enough so that the steady-state effects caused by the background-traffic are completed before the arrival of the explicit-event, and preferably allows for at least a few implicit-events to occur before the arrival of the explicit-event. Shortening M0 reduces the simulation resource requirements, while lengthening M0 increases the simulation resource requirements. In general, the mini-simulation of an element provides a more detailed, and preferably more accurate, result than the analytical formulas used to determine the steady state performance, but at the cost of increased resource utilization.

If, at 320, the element is quiescent at time T0-M0, the steady-state conditions corresponding to the background-traffic are determined, at 330, and the element is initialized, based on these determined steady-state conditions, at 340. The generation of implicit-events begins, at 350. The simulation database 110 of FIG. 1 contains the parameters associated with the background-traffic. These parameters may range in complexity from an average packet size and occurrence rate to the parameters of a complex probability distribution function of packet sizes and arrival times. In a preferred embodiment of this invention, statistics that are collected from the actual network are imported into the simulation database 110, and the implicit-event generator 190 generates implicit-packets that correspond to the actual network. These and other techniques for generating a realistic representation of the actual or anticipated occurrences of background-traffic events will be evident to one of ordinary skill in the art of simulation. The process continues, at 399, such that the implicit-events continue to be generated until terminated by another process. The implicit-events are placed on the discrete simulation schedule 180 of FIG. 1, for processing by the discrete simulator 150 at substantially the same level of detail as the explicit-events.

If, at 320, the element is active (non-quiescent) at time T0-M0, the new explicit-event merely causes the continued generation of implicit-events. The block 380 representing this action is illustrated as a dashed block because this action does not normally require an express action. As discussed above, the generation and processing of the implicit-events for each element continues as long as at least one explicit-event remains at the element. That is, the process illustrated in FIG. 3 initiates the implicit-event generation, and another process, such as illustrated in FIG. 4, terminates the implicit-event generation.

Figure 4:
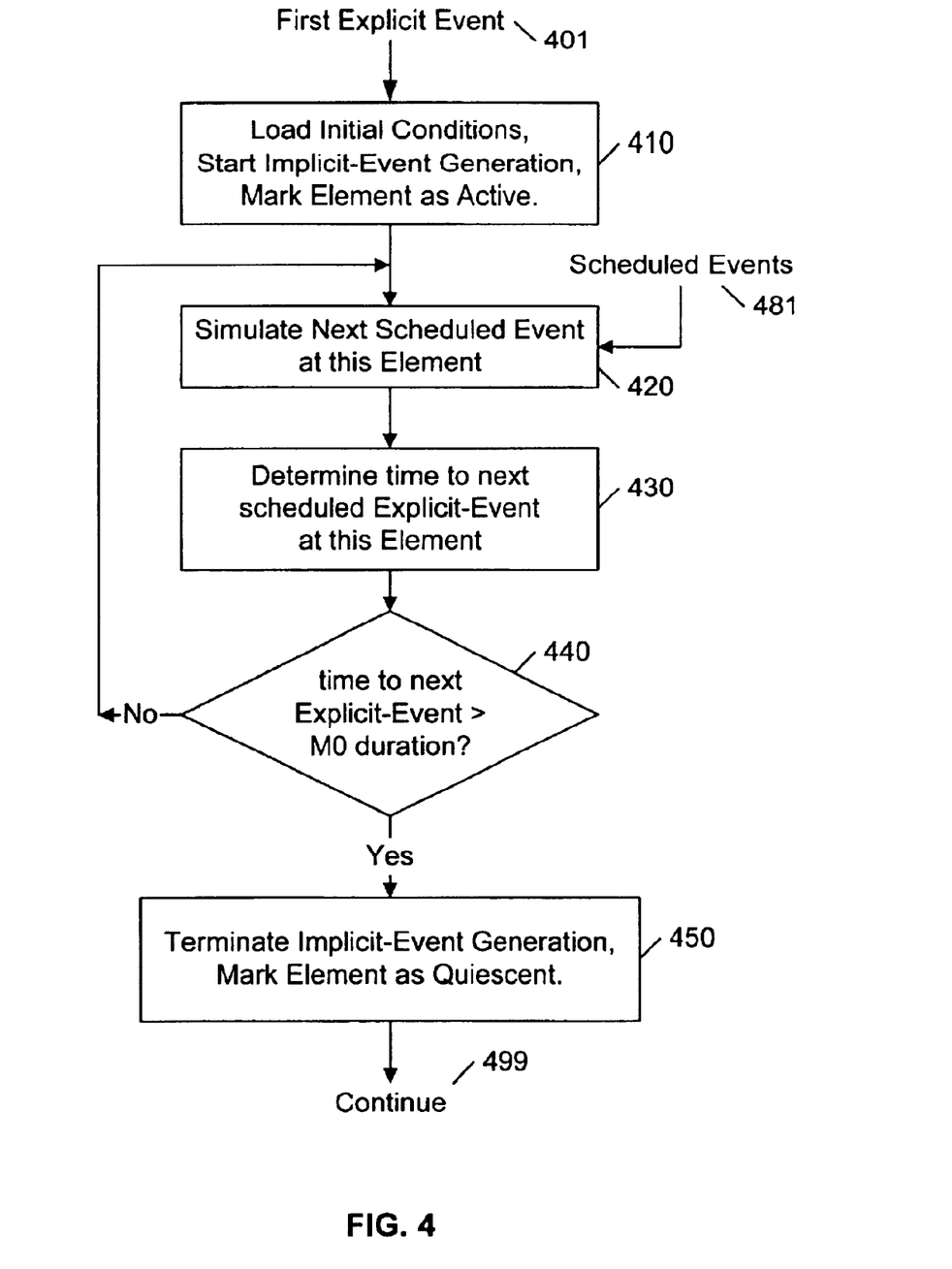
FIG. 4 illustrates an example flow diagram of a discrete simulator in accordance with this invention.

FIG. 4 illustrates an example flow diagram of a discrete simulator in accordance with this invention. Each explicit-event is associated with a particular element. That is, for example, the explicit-event may be the arrival of a packet at an element, the transmission of the packet from the element, a storage of the packet at the element, and so on. Some or all of these explicit events cause the generation of other explicit-events at other elements; for example, the transmission-event of a packet from one element causes a reception-event at another element at a subsequent time. In a similar manner, the implicit-events are also associated with particular elements. The aforementioned "mini-simulation" is generally performed for each element having an associated explicit event.

The block 410 represents the process discussed above with regard to FIG. 3. Upon notification of a first explicit event 401, the element's initial conditions are determined and loaded, based on the steady-state conditions associated with the background-traffic, and the generation of implicit-events corresponding to the parameters of the background-traffic commences. At this block 410, the element is also marked as being "active", to facilitate the quiescent-state determination at block 320 of FIG. 3. As is common in the art of discrete simulation, the discrete simulator 150 of FIG. 1 operates using a "simulation-time" parameter, and controls the simulation of each element based on the scheduled time for each event associated with each element. Upon receipt of a scheduled event 481 associated with this element, the scheduled event 481 is processed in accordance with the simulation model that is associated with the element, at 420. This scheduled event 481 may be an implicit-event or an explicit-event. Thereafter, the time to the next scheduled explicit-event at this element is determined, at 430. If, at 440, the time to the next scheduled explicit-event is greater than the aforementioned mini-simulation duration M0, then there is no need to continue the detailed simulation of this element, and the implicit-event generation for this element is terminated, at 450. The element is marked as quiescent, and the process continues, at 499, until a notification of another explicit-event 401 at this element causes the process of FIG. 4 to be repeated. Note that, because the initial conditions corresponding to the background-traffic are determined for each element at the commencement of each mini-simulation, the simulation in accordance with this invention allows for the simulation of time-varying background-traffic. For example, the background-traffic in a network in an office environment may be characterized as minimal traffic before 7 a.m., moderate traffic between 7 a.m. and 10 a.m., intense traffic between 10 a.m. and 4 p.m., and so on. In accordance with another aspect of this invention, a preferred embodiment of this invention also allows for an effective modeling of the transient periods as the background-traffic changes. A conventional analytic modeling technique allows for a determination of the steady-state traffic for each specified set of background-traffic parameters, but does not address the transient periods between the specified sets. A preferred embodiment of this invention models the background-traffic transition periods using a function that asymptotically approaches the steady-state conditions that are determined by the analytic model processor 130 of FIG. 1. That is, a change of background-traffic is modeled as a continuous, somewhat gradual, change from one set of steady-state conditions to the next set of steady-state conditions. The rate at which the function approaches the steady-state condition can be specified, and is usually determined based upon observations of traffic patterns in the actual network that is being simulated, or based upon anticipated traffic patterns for a proposed network that is being simulated.

Other conditions and rules can be applied to improve the representative nature of the simulated network to an actual network, as would be evident to one of ordinary skill in the art. Of particular note, as noted above, the transition periods between simulation modes may be modeled using certain heuristics, to better model such transitions.

Figure 5:
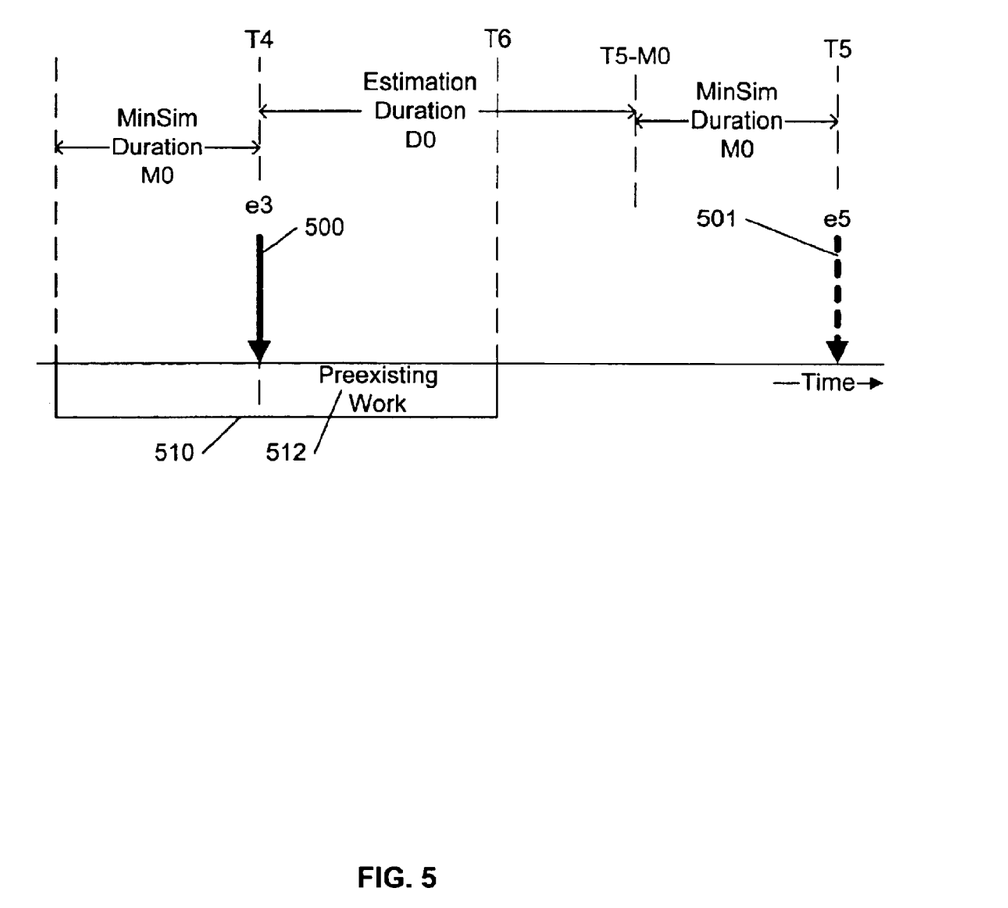
FIG. 5 illustrates an example timing diagram of a transition from the processing of one explicit-traffic event and another in accordance with this invention.

FIG. 5 illustrates an example timing diagram of a transition from discrete simulation (mini-simulation) and steady-state simulation. At T4, an event e3 500 occurs, and effects a mini-simulation that simulates discrete work 510 about the event e3 500, as discussed above with regard to FIG. 2's event 200. Relative to the occurrence of a subsequent event e5 501, the element has a remainder of preexisting work 510 caused by event e3 500. As discussed above, if the anticipation time T5-M0 of the mini-simulation associated with the event e5 501 corresponds to a time before the completion T6 of the preexisting work 510, then the element is considered active, and the discrete mini-simulation of the element will continue, and the response of the element to the occurrence of event e5 501 will be based on this continued mini-simulation.

If the anticipation time T5-M0 corresponding to the event e5 501 is substantially far from the end T6 of the mini-simulation of the element, the condition of the element at the anticipation time T5-M0 will be the aforementioned "steady state" condition associated with the element.

If, however the anticipation time T5-M0 is somewhat close to the end T6 of the mini-simulation of the element, a number of factors may be considered in order to determine the condition of the element at the start T5-M0 of the next mini-simulation of the element.

If, for example, the load on the element in response to the explicit event e3 500 exceeds the capacity of the element, the amount of work at the element will continue to grow. In a preferred embodiment, a linear approximation of the growth in the amount of work from the event e3 500 is used to estimate the amount of work at the element at the start T5-M0 of the mini-simulation of the element in response to event e5 501.

If, for example, the load on the element is approximately equal to the capacity of the element, the load will very gradually tend toward the steady state. In this case, the ability of the element to reach steady state is dependent upon the duration D0 since the prior explicit event that caused this load. In a preferred embodiment, the change of load on the element is limited to a factor that is proportional to the square root of the duration D0, to emulate the gradual change toward the steady state. At the anticipation time T5-M0 corresponding to the event e5 501, the estimated load, based on this gradual change, is used as the initial condition for the mini-simulation of the element.

If, on the other hand, the load on the element is substantially less than the capacity of the element, then the characteristics of the preexisting work 510 are used to determine an appropriate determination of the initial conditions at the start T5-M0 of the mini-simulation. If the preexisting work 510 is substantial, an estimate of when the preexisting work 510 and any coincident background work will first be completed is determined, using an assumed constant arrival rate for the background work. If the time of this zero-work estimate is less than the start T5-M0 of the mini-simulation, the increase of work to the steady-state condition is estimated as discussed above, using the time of the zero-work estimate as the base for commencing this increase. If the time of this zero-work estimate is greater than the start T5-M0 of the mini-simulation, then a linear estimate of the amount of work at the element at the start T5-M0 is used as the initial condition for the mini-simulation of the element.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A method of enabling a simulation, comprising:
   enabling an encoding of a network architecture, the network architecture comprising a plurality of elements and at least one link between two elements of the plurality of elements,
   enabling an encoding of one or more background-traffic parameters associated with the at least one link of the network architecture,
   enabling an encoding of one or more discrete event parameters that facilitates a generation of explicit-traffic, and
   enabling a determination of properties associated with a propagation of the explicit-traffic across the at least one link in dependence upon an effect of the one or more background-traffic parameters, by simulating the background traffic as implicit-traffic events in the vicinity of each occurrence of explicit-traffic events, based on the explicit-traffic.

2. The method of claim 1, wherein the determination of the effect of the one or more background-traffic parameters includes a steady-state analysis of the network architecture based on a rate-based parameter of the one or more background-traffic parameters.

3. The method of claim 1, wherein
   the one or more background-traffic parameters includes stochastic process parameters, and
   the method further includes
   enabling a determination of the effect of the one or more background-traffic parameters based on a stochastic process.

4. The method of claim 3, wherein,
   the stochastic traffic parameters are associated with information items, and include at least one of:
   a mean information item size,
   a distribution parameter associated with the mean information item size,
   a mean information item arrival rate, and
   a distribution parameter associated with the mean information item arrival rate.

5. The method of claim 1, further including:
   enabling an encoding of a protocol associated with the explicit-traffic, and
   wherein
   the determination of properties associated with the propagation of the explicit-traffic is further dependent upon an effect of the associated protocol.

6. The method of claim 1, further including:
   enabling an encoding of a first time-parameter that is associated with the background-traffic parameters, and
   enabling an encoding of a second time-parameter that is associated with the explicit-traffic, and
   wherein
   the determination of properties associated with the propagation of the explicit-traffic is further based on the first time-parameter and the second time-parameter.

7. The method of claim 1, wherein the enabling of the determination of the properties associated with the propagation of the explicit-traffic includes:
   enabling a determination of a scheduled time that is associated with an explicit event that is associated with the explicit-traffic,
   enabling a determination of an anticipation time based on the scheduled time,
   enabling a determination of a composite background effect at the anticipation time based on the one or more background-traffic parameters,
   enabling a determination of the implicit-traffic events that is based on the one or more background-traffic parameters, and
   enabling the determination of the properties associated with the propagation of the explicit-traffic in dependence upon the implicit-traffic events.

8. The method of claim 7, wherein enabling the determination of the composite background effect at the anticipation time includes:
   enabling a determination of a steady-state background effect, and
   enabling a determination of the composite background effect at the anticipation time based on a function that asymptotically approaches the steady-state background effect.

9. The method of claim 1, wherein
   the determination of the effect of the one or more background-traffic parameters includes:
   a steady-state analysis of the network architecture based on the one or more background-traffic parameters, and
   a particularization of implicit-traffic corresponding to the one or more background-traffic parameters, and
   wherein
   the effect is determined from at least one of the steady-state analysis and the particularization of implicit-traffic.

10. A simulator comprising:
an explicit-event generator that is configured to generate an explicit-event and an associated explicit-event time,
an analytic model processor that is configured to provide a background simulation state in the vicinity of the explicit-event time, based on at least one background-traffic parameter,
a discrete simulator that is configured to apply the explicit-event to an element model to determine an explicit-event-output and an associated explicit-event-output time that is dependent upon the explicit-event time and the background simulation state.

11. The simulator of claim 10, wherein
the at least one background-traffic parameter is a parameter of a stochastic process, and
the analytic model processor is configured to provide the background stimulation state based on the stochastic process.

12. The simulator of claim 10, further including
an implicit-event generator that is configured to generate an implicit-event and an associated implicit-event time, based on the at least one background-traffic parameter,
wherein:
the discrete simulator is further configured to apply the implicit-event to the element model to determine an implicit-event-output, and is configured to determine the explicit-event-output in further dependence upon the implicit-event-output.

13. The simulator of claim 12, wherein
the at least one background-traffic parameter is a parameter of a stochastic process, and
the implicit-event generator is configured to generate the implicit-event and the implicit-event time based on the stochastic process.

14. The simulator of claim 13, wherein
the parameter of the stochastic process is associated with information items, and includes at least one of:
a mean information item size,
a distribution parameter associated with the mean information item size,
a mean information item arrival rate, and
a distribution parameter associated with the mean information item arrival rate.

15. The simulator of claim 10, wherein the simulator is configured to evaluate a performance parameter of a network architecture,
the network architecture comprising a first element, a second element, and a link path between the first and the second elements,
the discrete event corresponding to an arrival of an information item at the first element at the discrete event time,
the background simulation state corresponding to a quantity of other information items being communicated between the first element and the second element via the link,
the element model corresponding to the first element and comprising
an input queue model having an initial queue length that is dependent upon the background simulation state, and
a processing model that determines the explicit-event-output and the explicit-event-output time based on the explicit-event time and the initial queue length, and
wherein
the performance parameter is dependent upon a difference between the explicit-event-output time and the explicit-event time.

16. A method of enabling a determination of a performance parameter associated with a network, the network comprising a plurality of elements and at least one link path between two elements of the plurality of elements, the method comprising:
defining a first background-traffic load on the link path via a first set of stochastic traffic parameters,
defining a second background-traffic load on the link path via a second set of stochastic traffic parameters,
defining a first time duration and a second time duration,
evaluating the performance parameter based on a stochastic process having the first set of stochastic traffic parameters during the first time duration, and having the second set of stochastic traffic parameters during the second time duration.

17. The method of claim 16, further including:
determining a first set of steady-state conditions based on the first background-traffic load,
determining a second set of steady-state conditions based on the second background-traffic load, and
evaluating the performance parameter based on a continuous change from the first set of steady-state conditions and the second set of steady-state conditions during a third time duration corresponding to a transition from the first time duration to the second time duration.

18. The method of claim 16, wherein
the stochastic process corresponds to a processing of information items, and
each of the first set and the second set of stochastic traffic parameters is associated with the information items, and includes at least one of:
a mean information item size,
a distribution parameter associated with the mean information item size,
a mean information item arrival rate, and
a distribution parameter associated with the mean information item arrival rate, and
the performance parameter is associated with a throughput parameter associated with the processing of the information items.

19. A network simulator comprising:
a simulation database that includes:
a model of a network that includes elements and links between elements,
background-traffic parameters that characterize background-traffic among the elements,
explicit-traffic parameters that characterize explicit-traffic among the elements;
a controller that is configured to control the network simulator, including control of a simulation time;
an explicit event generator that is configured to generate explicit events at scheduled simulation times, based on the explicit-traffic parameters;
an analytic model processor that is configured to determine steady-state conditions at the links between elements at select times, based on the background-traffic parameters;
an implicit event generator that is configured to generate implicit events at scheduled simulation times, based upon the steady-state conditions; and
a discrete event simulator that is configured to also generate explicit events at scheduled simulation times, based on the processing of the implicit events and explicit events at the elements;
wherein
the controller is configured to provide the select times to the analytic model processor based on the scheduled simulation times of the explicit event, and the implicit event generator is configured to generate the implicit events in advance of the scheduled simulation times, so that processing of the explicit events at the elements includes effects caused by the background-traffic.

20. A method of simulating explicit-traffic in a network, comprising:

defining background-traffic that may affect traffic flow among elements of the network, scheduling discrete explicit-traffic events in the network, based on the explicit-traffic, scheduling discrete implicit-traffic events in the network preceding one or more of the explicit-traffic events, based on an analytic processing of the background-traffic, simulating effects of the discrete implicit-traffic events before the explicit-traffic events, to define states of elements in the network upon occurrence of the explicit-traffic events, and simulating effects of the discrete explicit-traffic events, based on the states of the elements in the network.

* * * * *